UNITED STATES PATENT OFFICE.

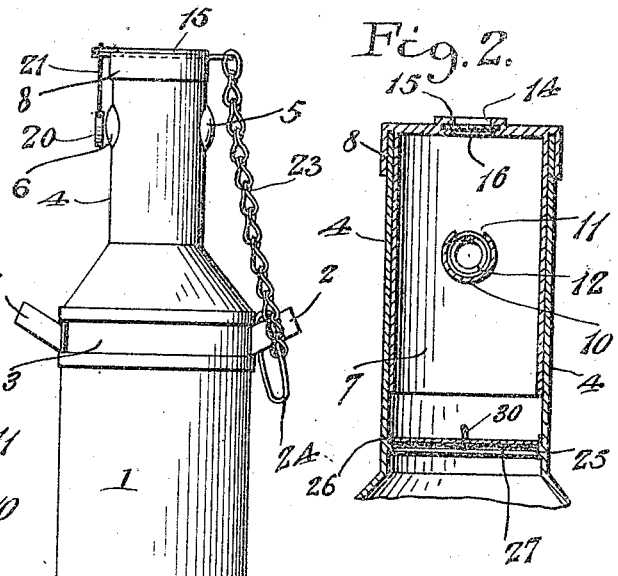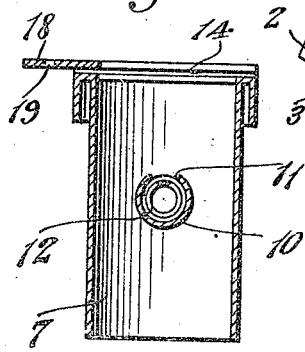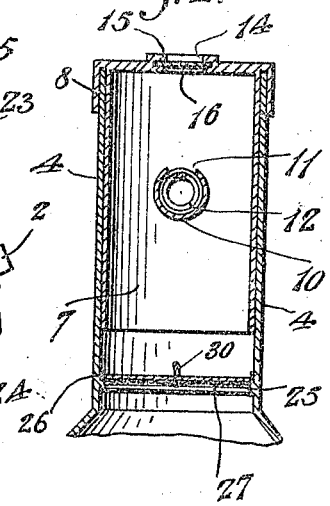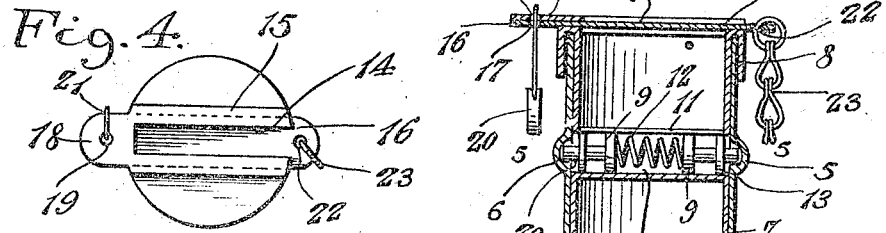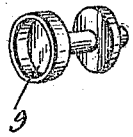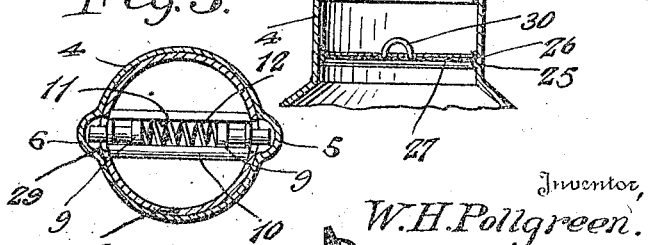

WILLIAM HENRY POLLGREEN, OF BISBEE, ARIZONA.

SHIPPING MILK-CAN.

1,183,490.

Specification of Letters Patent.

Patented May 16, 1916.

Application filed June 15, 1915. Serial No. 34,210.

*To all whom it may concern:*

Be it known that I, WILLIAM H. POLLGREEN, a subject of Great Britain, residing at Bisbee, in the county of Cochise and State of Arizona, have invented certain new and useful Improvements in Shipping Milk-Cans; and I do hereby declare the following to be a full, clear, and exact description of the invention, such as will enable others skilled in the art to which it appertains to make and use the same.

The invention relates to improvements in shipping milk cans and analogous containers.

The object of the present invention is to improve the construction of cans and analogous containers for shipping milk and other commodities and to provide a simple, practical and comparatively inexpensive container equipped with a stopper or closure provided with concealed locking means and having a seal which must be destroyed in order to obtain access to the locking means whereby it will be impossible to remove or otherwise affect the contents of the container without disclosing clearly the fact that the same has been opened.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing Figure 1 is a side elevation of a milk can constructed in accordance with this invention, Fig. 2 is an enlarged vertical sectional view through the neck of the can, Fig. 3 is a vertical sectional view taken at right angles to Fig. 2, Fig. 4 is a plan view of the closure or stopper, Fig. 5 is a horizontal sectional view taken on the line 5—5 of Fig. 3, Fig. 6 is a vertical sectional view of the closure showing the same removed from the milk can, Fig. 7 is a detail perspective view of one of the spring actuated bolts.

Like numerals of reference designate corresponding parts in all the figures of the drawing.

In the accompanying drawing in which is illustrated the preferred embodiment of the invention, 1 designates a milk can but the improvements are applicable to various containers for shipping various commodities. The milk can 1 is provided at opposite sides with handles 2 preferably in the form of loops secured to a band 3 encircling and reinforcing the can and adapted to relieve the same when the said can is lifted by the handles 2. The band 3 is adapted to distribute the strain throughout the can and prevent the side portions of the can from being subjected to such strain.

The milk can is also provided with a cylindrical neck 4 having interior recesses 5 forming shoulders for engaging a pair of oppositely disposed spring actuated bolts 6 for securing a closure 7 in the neck of the receptacle 1. The closure 7 which is substantially cylindrical is provided at the top with an exterior approximately L-shape annular flange 8 which forms a cap to fit over the upper edges of the neck as clearly illustrated in Figs. 2 and 3 of the drawing. The spring actuated bolts which are provided with inner heads are slidable in a horizontally disposed transversely arranged housing 10 of substantially cylindrical form provided at the top with an opening 11 extending longitudinal of the housing and exposing the bolt to enable the same to be readily retracted by a suitable device, not shown, having legs or arms adapted to engage the head 9. A coiled spring 12 is interposed between the heads 9 of the bolts 6 which are also provided with collars or flanges 13 forming stops for limiting the outward movement of the bolts. The collars or flanges 13 fit against the inner face of the cylindrical closure or stopper. When the spring actuated bolts are withdrawn from engagement with the recesses of the neck of the can, the stopper or closure is partially rotated to prevent the bolts from reëngaging the can and the stopper or closure may then be readily withdrawn.

The stopper or closure is provided at the top with a slot or opening 14 to afford access to the locking device and it has opposite grooves or ways 15 located at the sides of the slot or opening 14 to receive a slide 16 provided at one end with a perforation 17 adapted to extend beneath a lip or flange 18 and to register with an opening 19 thereof to receive the wire 21 of a seal 20. The other end of the slide 16 which is substantially oblong is provided with a perforation 22 into which is linked one end of a chain 23 having a ring 24 at its other end arranged on one of the handles 2. The seal may be of any desired character such as an ordinary car seal and access cannot be had to the locking mechanism until the seal is removed.

The neck 4 is provided at the lower portion with a support 25 consisting of a rib or projection forming a shoulder and adapted to support a ring 26 carrying a fabric consisting of a piece of cheese cloth or any other suitable material adapted to exclude dust from the interior of the can or receptacle 1. The ring and the fabric constitute a dust seal but any other suitable means may be employed for this purpose. The ring or support on which the cheese cloth or other fabric is placed is preferably formed by a disk and is provided with a projecting lip 30 to facilitate its removal.

The stopper or closure is provided at opposite sides with openings 29 through which the bolts project and the collars or flanges 13 are of greater diameter than the openings 29.

What is claimed is:—

1. A device of the class described including a receptacle, a closure for the receptacle provided with an opening and having an interiorly arranged concealed locking device located below the said opening for engaging the receptacle to retain it in position, a cover for the said opening and completely concealing the locking device and means for sealing the cover.

2. A device of the class described including a receptacle, a closure for the receptacle having an interiorly arranged concealed locking device located below the said opening for engaging the receptacle to retain the closure in position, said closure being provided with an opening communicating with the locking means having opposite ways, a slide mounted in the ways for covering the said opening and completely concealing the locking device, said slide and closure having seal receiving means.

3. A device of the class described including a receptacle having a neck provided with interior recesses, a stopper or closure fitted in the neck and provided with interiorly arranged locking devices for engaging the said recess, said stopper or closure being provided at the top above the said locking device with an opening and having grooves or ways at opposite sides thereof, a slide arranged in the grooves or ways and covering the opening and completely concealing the locking device and a seal receiving perforation and a fixed ear or lip projecting from the stopper or closure and adapted to receive the seal.

4. A device of the class described including a receptacle having a neck provided with opposite interior recesses, a stopper or closure fitting in the neck and provided with opposite openings and having a housing disposed transversely of the stopper or closure and communicating with the said openings, spring actuated bolts mounted in the housing and provided with collars or flanges arranged to engage the stopper or closure to limit the outward movement of the bolts, said stopper or closure being provided above the said housing with an opening to afford access to the bolts and means for covering and sealing the opening and completely concealing the device.

5. A device of the class described including a receptacle having a substantially cylindrical neck, a stopper or closure fitting within the neck and provided with an annular flange substantially L-shaped in cross section overlapping the upper edge of the neck, and interiorly arranged locking means carried by the stopper or closure for securing it in the neck.

6. A device of the class described including a receptacle having a handle, a stopper or closure for the receptacle provided with an opening and having guides or ways at opposite sides thereof, means carried by the stopper or closure and arranged within the same for securing the said stopper or closure in the receptacle, a slide mounted in the grooves or ways, a flexible connection attached at one end to an end of the slide and connected at its other end to the said handle of the receptacle and means located at the other end of the slide for sealing the same in its closed position.

In testimony whereof I affix my signature in presence of two witnesses.

WILLIAM HENRY POLLGREEN.

Witnesses:
J. A. KEMPTON,
GEO. W. VANDERWALKER.